United States Patent [19]

Houck et al.

[11] Patent Number: 5,154,543
[45] Date of Patent: Oct. 13, 1992

[54] METHOD AND APPARATUS FOR INSTALLATION OF DRAINAGE FIELD

[76] Inventors: Randall J. Houck; Michael H. Houck; Harold J. Houck, all of P.O. Box 867, Pisgah Forest, N.C. 28768

[21] Appl. No.: 743,814

[22] Filed: Aug. 12, 1991

Related U.S. Application Data

[62] Division of Ser. No. 667,460, Mar. 11, 1991, Pat. No. 5,051,028, which is a division of Ser. No. 164,255, Mar. 4, 1988, Pat. No. 5,015,123.

[51] Int. Cl.$^5$ .............................................. E02B 11/00
[52] U.S. Cl. ..................................... 405/303; 29/234; 452/44; 53/527; 53/530; 405/43; 405/45; 138/118.1
[58] Field of Search .......................... 405/43, 45, 303; 29/234, 252; 452/42, 44; 53/527, 576, 581, 567, 529, 530, 409, 449, 450, 428; 138/118.1; 100/179

[56] References Cited

U.S. PATENT DOCUMENTS

| 1,022,305 | 4/1912 | Dean | 452/42 X |
|---|---|---|---|
| 2,540,272 | 2/1951 | Malmstrom et al. | 52/530 X |
| 2,889,574 | 6/1959 | Thielen et al. | 452/44 X |
| 3,422,595 | 1/1969 | Vatterott | 53/528 |
| 3,563,825 | 2/1971 | Segura et al. | 405/157 X |
| 3,802,337 | 4/1974 | St-Hiliare | 53/530 X |
| 3,815,323 | 6/1974 | Longo | 100/179 X |
| 3,952,529 | 4/1976 | Lefever | 405/157 |
| 4,104,774 | 8/1978 | Overmyer et al. | 405/43 |
| 4,110,991 | 9/1978 | Torkuhl | 405/157 |
| 4,590,000 | 5/1986 | Baatz et al. | 53/527 X |

FOREIGN PATENT DOCUMENTS 201776 5/1956 Australia .................. 53/581

Primary Examiner—Dennis L. Taylor
Attorney, Agent, or Firm—Allen, Dyer, Doppelt, Franjola & Milbrath

[57] ABSTRACT

A preassembled unit for a sewage nitrification field has minimum outward dimensions of loose, lightweight plastic aggregate material enveloped and bound by a plastic sleeve around a horizontal conduit. In one embodiment, the unit takes a bag form with an aggregate-filled netting sleeve concentrically surrounding and fastened to the ends of corrugated plastic vent pipe. In another form, the sleeve is a plastic extrusion of rectangular cross-section and the conduit can be formed integrally with the sleeve. Cross-webbing is added for strength. In ground installation, conduitless units make up the insufficiency of aggregate dimension. Mating male and female end caps are used to interconnect the conduit of adjacent units end-to-end. Apparatus for manufacturing the concentric netting sleeve/vent pipe version has a hopper that discharges aggregate into the top of a mandrel and an annular disc or helical auger blade that pushes the aggregate forward into the sleeve.

12 Claims, 4 Drawing Sheets

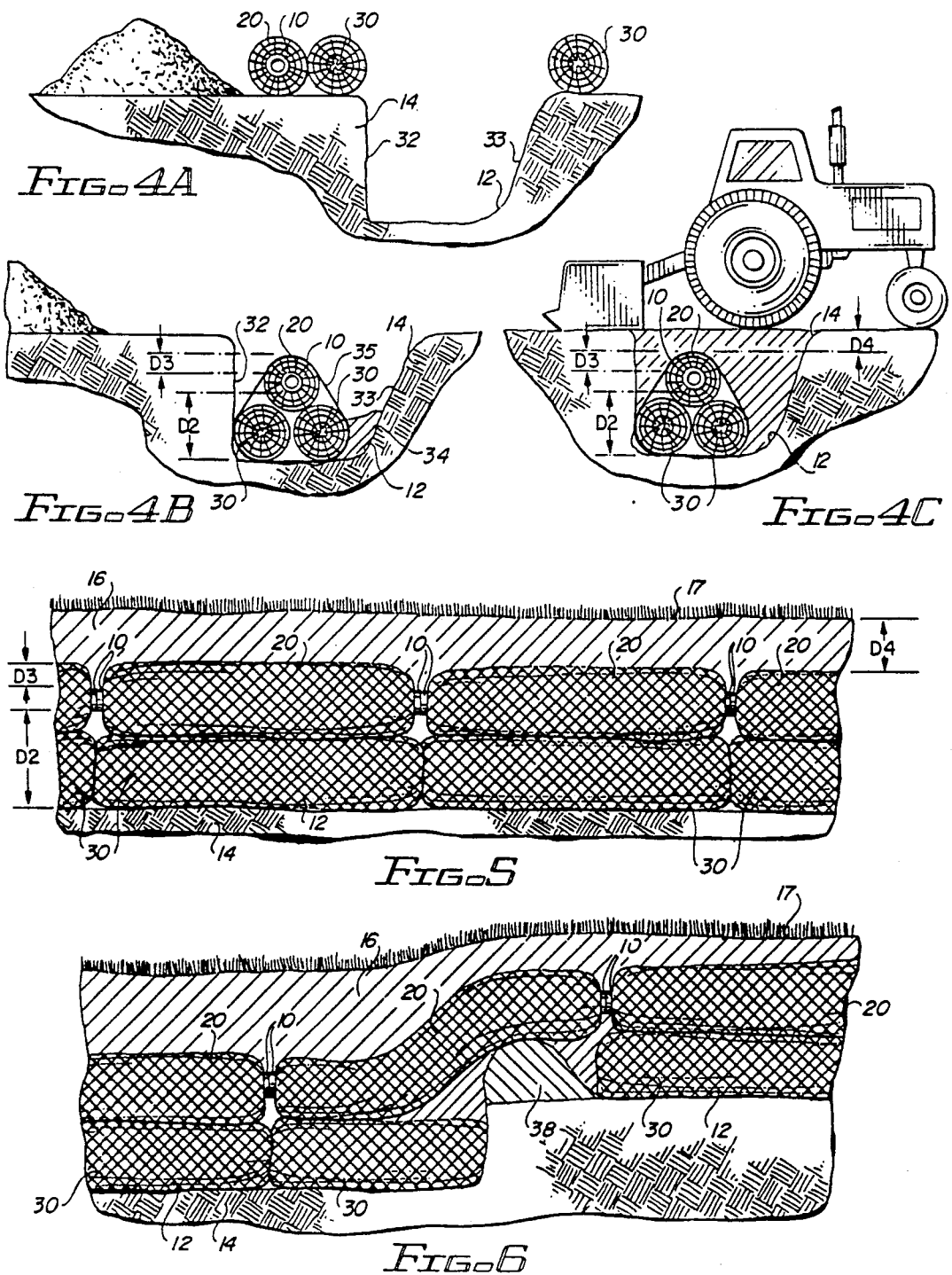

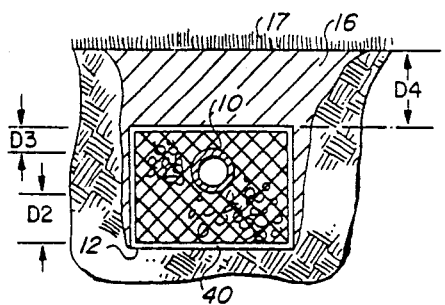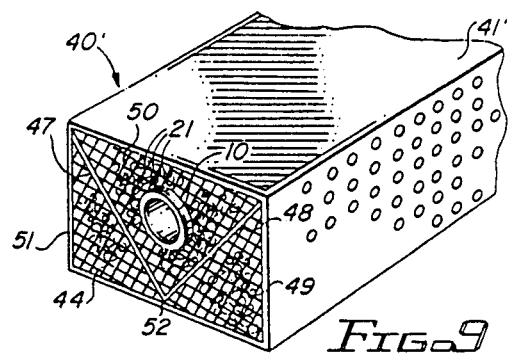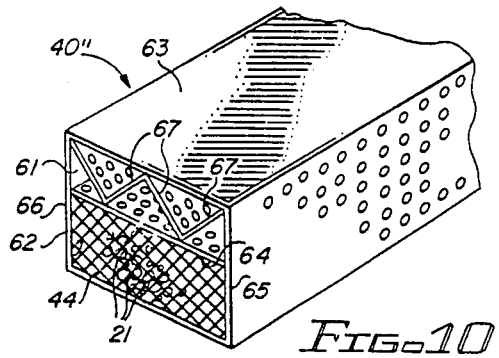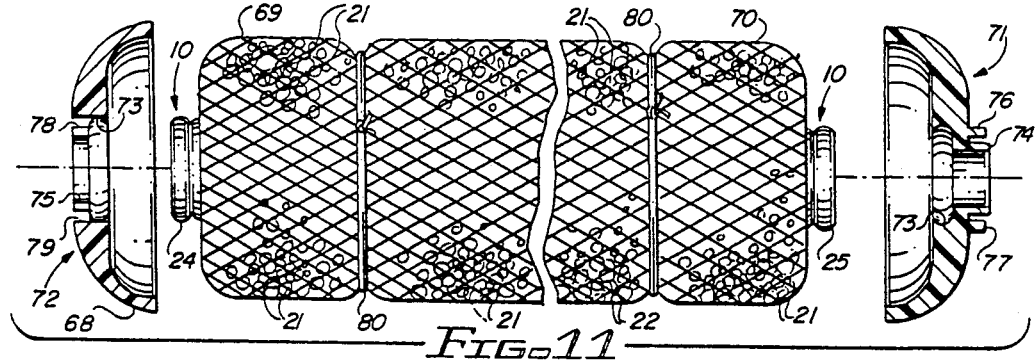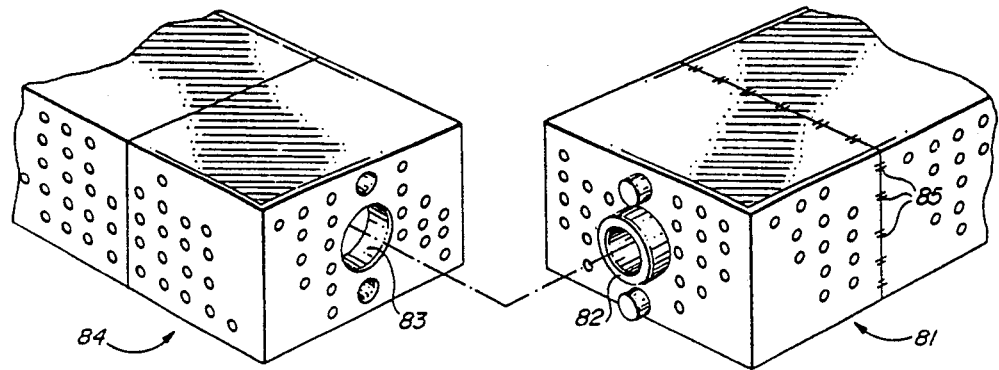

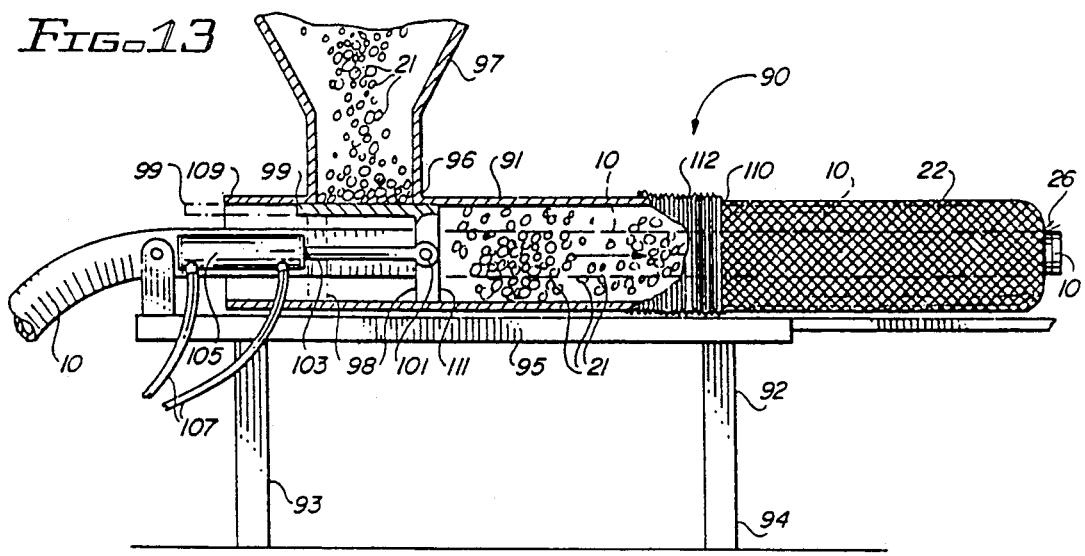
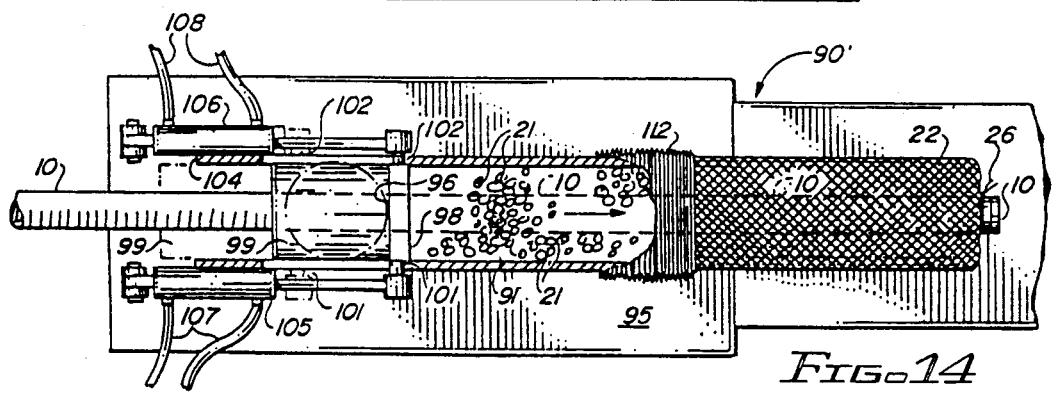
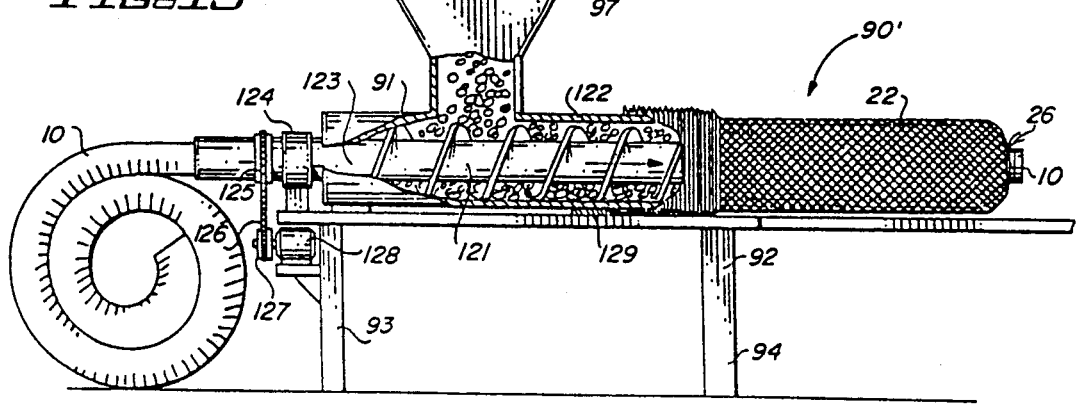

METHOD AND APPARATUS FOR INSTALLATION OF DRAINAGE FIELD

This is a division of application Ser. No. 07/667,460 filed Mar. 11, 1991, now U.S. Pat. No. 5,051,028, which in turn is a division of parent application Ser. No. 07/164,255 filed Mar. 4, 1988, now U.S. Pat. No. 5,015,123.

This invention relates to a method and apparatus for the installation of a drainage field, such as a nitrification field employed in a ground absorption sewage treatment and disposal system; and, in particular, relates to a preassembled drainage line unit and method employing the same.

BACKGROUND OF THE INVENTION

Conventional drainage systems of the type to which the present invention relates typically comprise a horizontally extending perforated conduit disposed within a drainage trench and surrounded by a quantity of loose aggregate material, such as rock or crushed stone, and covered with compacted soil. The space between the conduit and the ground occupied by the aggregate serves to define a drainage cavity in fluid communication with the perforations of the conduit.

An example of such a drainage system is found in the nitrification field of conventional ground absorption sewage treatment and disposal systems wherein effluent is discharged from a septic tank through the perforated vent pipe of a nitrification line which is surrounded by a specified minimum volume of aggregrate material, such as rocks or crushed stone. The purpose of the nitrification field is to create a storage area for sewage effluent until it can be absorbed by the soil (percolate). The aggregate material acts to maintain the boundaries of the storage area, prevent blockage of the pipe perforations, promotes the beneficial effects of biomat development (aerobic bacteria organisms that act on the sewage colloidal materials to reduce them to soil) and retards development of the clogging mat (i.e. the mechanical loss of infiltrative capacity at the soil surface interface due to suspended solids, bacteria growth and ferrous sulfide precipitation).

Conventional ground absorption disposal systems of that type utilize septic tanks and nitrification lines of adequate construction and design volume in accordance with provisions of local building and health codes governing the sanitary disposal of wastes. The effluent from the septic tank flows by gravity to an approved nitrification line where the soil provides for final treatment and disposal of the sewage. The actual processing depends upon the class of soil texture (whether sand, loam, clay or mixtures and variations of the same) into which the nitrification line extends. The square footage of area needed for the nitrification field in a trenched system depends on the rate and volume of effluent to be disposed. The perforated conduit serves the dual purpose of delivering the effluent to the aggregate filled cavity for absorption into the soil and to vent sewage gases to prevent local concentration thereof.

The installation of conventional nitrification lines involves digging a trench and depositing loose aggregate in the form of rock or crushed stone materials into the trench for a minimum depth. The horizontal conduit in the form of a perforated pipe is then laid down on the base aggregate and surrounded by additional quantities of the aggregate to give required minimum vertical and horizontal dimensions of aggregate surrounding the pipe. The trench, pipe and aggregate volume and thickness dimensions must all conform to local sanitary disposal codes and specifications. A typical system might, for example, utilize a four inch minimum inside diameter Schedule 40 PVC pipe or equivalent, set in substantially horizontal orientation with a minimum fall of not less than ⅛ inches per foot. The tubing may, for example, be four- or six-inch diameter corrugated plastic tubing complying with applicable ASTM standards having three rows of holes each ½ to ¾ inches in diameter, spaced longitudinally on approximately four-inch centers. The rows of holes may be equally spaced 120° on centers about the periphery or three rows may be located in the lower portion of the tubing with the outside rows being approximately 120° on centers.

The nitrification trenches are constructed as level as possible, with the fall in a single trench bottom meeting local maximum requirement, such as not to exceed ¼ inches in ten feet. Trench diameters are chosen to prevent too rapid a rate of sewage discharge or too great a strength into the zone of aeration where organic effluent conversion into soil occurs. Typical trench diameters are about three feet in width and two to three feet in depth.

The loose aggregate placed in the trench to surround the vent pipe is typically required to be clean washed gravel (rock or crushed stone) which is graded or sized between ¾ and 2 ½ inches. The gravel in a typical system is required to be placed a minimum of one foot deep with at least six inches below the pipe and two inches over the pipe, and to be distributed uniformally across the trench bottom and over the pipe. Soil cover over the nitrification field is specified to be a depth of at least six inches, or so, with the finished grade over the field being landscaped to prevent ponding of surface water and to encourage surface water runoff to be diverted away from the nitrification field.

Other mechanisms such as effluent distribution devices (including distribution boxes, flow dividers and flow diversion devices), grease traps, or the like are also included as required and approved by state and/or local health regulations.

Stepdowns or dropboxes are used where topography prohibits the placement of nitrification trenches on level grade. Their placement and design is in accordance with local specifications.

Conventional installation of drainage fields such as those described, requires the installation of rock, shell, or other labor intensive material under, around and over corrugated tubing. Such installation methods do not lend themselves well to installations involving adverse terrain, working area or unskilled worker abilities. The requirement for uniformity and inspections for compliance with state and local codes makes the installation process tedious and time consuming.

SUMMARY OF THE INVENTION

The invention provides a method and apparatus for the installation of a drainage field, such as a nitrification field employed in a ground absorption sewage treatment and disposal system, that employs a preassembled drainage line unit for placement in a trench which provides a uniformity and ease of installation heretofore unavailable.

In one aspect of the invention a preassembled drainage line unit is provided in which loose aggregate in the form of lightweight materials is provided in surrounding relationship to a preforated conduit and bounded thereto by a perforated sleeve member. The aggregrate surrounds the pipe to meet minimum drainage cavity dimension requirements and to protect the pipe from crushing.

The unit is flexible to provide for ease of installation to conform to uneven terrain and winding ditch contours.

The unit provides considerable cost savings in drain installation by reducing the machinery, labor, skill and time involved for transportation and placement.

The units can be installed end-to-end allowing more than just pipe to be installed without the added expense of hauling heavier aggregrate materials to job sites and providing a drainage material and method which assures good drainage characteristics and dimensional uniformity at a reasonable price. The invention provides a lightweight, inexpensive factory-assembled unit that can be quickly installed on site for footings open trenches, or with state approval, in nitrification fields used as discharge points for septic tanks.

No trucks or heavy equipment are needed to bring the aggregrate to the construction site. The only labor needed is to put each unit into position, thereby reducing valuable time. Rapid installation provides more footage at reduced costs. Estimation of workload is easier to calculate. Proper placement and correct amount of aggregate is assured for inspection purposes. Moisture retention and flow is comparable or better than systems utilizing gravel aggregate.

A preferred embodiment, described in greater detail below, provides a horizontal conduit in the form of corrugated or slotted perforated PVC pipe encased as a unit with loose lightweight pieces of plastic aggregate (e.g. plastic puffballs, chips or cubes) that act as a collector and transporter of watery materials. The aggregate is held in surrounding preestablished dimensional relationship to the pipe by means of a perforated sleeve, such as plastic netting, to provide prefabricated units of given length that can be set end-to-end.

BRIEF DESCRIPTION OF THE DRAWINGS

Embodiments of the invention have been chosen for purposes of illustration and description, and are shown in the drawings, wherein:

FIGS. 4A-4C are schematic section views showing the installation of a drainage field utilizing the units of FIGS. 2 and 3 in accordance with the principles of the method of the invention;

FIG. 5 is a schematic longitudinal section view of the installation of FIG. 4C for a horizontal level field layout;

FIG. 6 is a schematic longitudinal section view of the installation of FIG. 4C for a serial distribution multiple-level layout;

FIG. 8 is a view similar to that of FIG. 4C showing installation method utilizing the embodiment of FIG. 7;

FIG. 9 is a modified form of the embodiment of FIG. 7;

FIG. 10 is a view of a further modified form of the embodiments shown in FIGS. 7 and 9;

FIG. 11 is a side view, partially in section, of an end cap for the embodiment of apparatus shown in FIG. 3, FIG. 12 is a perspective view of an end cap arrangement for the embodiment of apparatus shown in FIG. 7;

FIG. 13 is a side elevation view of machinery for the manufacture of the assemblies of FIGS. 3 and 4;

FIG. 14 is a top plan view of the machinery of FIG. 13; and

FIG. 15 is a side elevation view of an alternate embodiment of the machinery of FIGS. 13 and 14.

Throughout the drawings, like elements are referred to by like numerals.

DESCRIPTION OF THE PREFERRED EMBODIMENTS

The method and apparatus of the invention are described by way of example in terms of embodiments thereof incorporated for use in the installation of a drainage system in the form of a nitrification field for a ground absorption sewage treatment and disposal system. Installation and inspection of the field is to be in accordance with appropriate laws, ordinances and rules governing the disposal of sewage. The details and dimensions of the installation are similar to those for systems using crushed stone or rock material, no crushed stone or rock being required.

Figure 1:
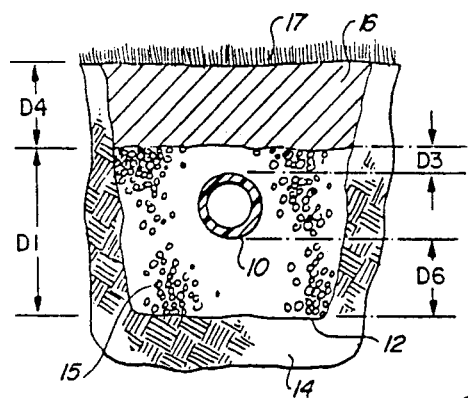
FIG. 1 is a schematic section view of a drainage field installation according to the prior art.

In order to consider the invention in context, FIG. 1 illustrates a conventional method for installation of a nitrification line.

As shown, a horizontally extending conduit in the form of a perforated vent pipe 10 is located within the confines of a nitrification trench 12 surrounded by undisturbed soil 14. Loose aggregate material in the form of rock or crushed stone 15 is placed in the trench 12 to a depth D1 to provide a specified depth D2 of base aggregate below the conduit 10 and a specified depth D3 above. A quantity of dirt 16 is added above the top of the aggregate 15 to a compacted depth D4 and landscaping 17 is provided above the compacted dirt 16. The depths D1–D4 are chosen to conform to appropriate laws, ordinances and rules governing sewage disposal for the field site location. Typical sanitary disposal specifications will require depths D1 of one foot, D2 of six inches, D3 of two inches and D4 of six inches, with the top grade of the soil cover 16 being landscaped to prevent surface water ponding and to encourage surface water runoff away from the nitrification field.

The vent pipe 10 in the conventional system illustrated in FIG. 1 may, for example, be four-inch inside diameter Schedule 40 PVC corrugated plastic pipe with three rows of perforations located in the lower portion of the tubing, with the outside rows being spaced approximately 120° on centers. The bottom of the trench 12 and the orientation of the pipe 10 are set to comply with local code requirements for minimum fall. The trench bottom for a single trench installation may, for a single trench installation for example, have a fall of ¼ inches in ten feet, as determined by an engineer's level.

It will be appreciated by contemplation of the representation shown in FIG. 1 that transportation of the heavy aggregate 15 to and placement in the trench 12 to achieve the required uniformity and depth surrounding the conduit 10 can be extremely cumbersome and time-consuming. The installation of such a system in mountainous terrain, for example, can be quite expensive and labor intensive requiring the heavy aggregrate to be trucked in and sometimes hauled great distances for proper placement in positioning in the trench 12. It will also be appreciated that for an absorption sewage treatment and disposal system such as that chosen for discussion purposes, considerable delays will be encountered during the inspection process while measurements are taken to determine compliance with the required minimum depths of rock above and below the conduit 10. It is not unusual in difficult terrain for a 50-foot long trench to take two to three hours to fill with aggregrate conduit and compressed topsoil.

In a typical prior art drainage field installation method, the trench 12 is first dug with a backhoe or similar implement Then, the base layer D2 of aggregrate material 15 must be carted into location and laid on the trench bottom. The pipe 10 is then placed centrally above the base aggregrate and additional aggregrate is added uniformally to surround the conduit 10, spacing it centrally widthwise of the trench 12 and providing the minimum offset D3 of aggregrate material 15 above the conduit 10. Lastly, the topsoil 16 is added above the aggregrate and compacted to achieve the minimum depth D4 and landscaped to provide appropriate grading for surface water runoff. The placement of the aggregrate 15 below, around and above the pipe 10 is difficult to control and good uniformity of dimension is hard to achieve. It is necessary during the installation process to continuously measure the distances around the pipe 10 to ensure that the aggregrate 15 is set in the required dimensions, and the completed installation is difficult and time-consuming to inspect.

The present invention utilizes apparatus in the form of a preassembled drainage line unit 20 (FIG. 2) having a length of conduit 10, such as corrugated PVC vent pipe, surrounded by a predetermined volume of loose aggregate material 21 which is bounded by a perforated sleeve member 22 to maintain uniform minimum dimensions of aggregrate thickness relative to the conduit 10.

Figure 2:
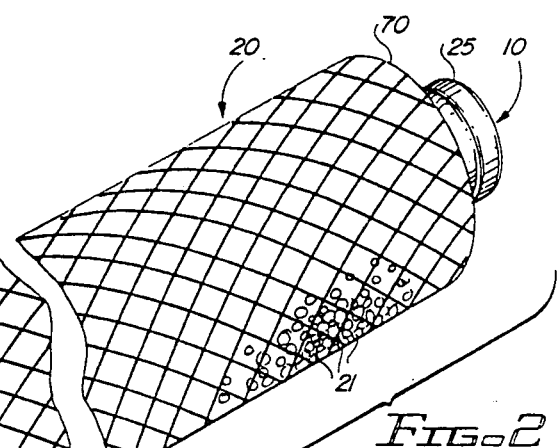
FIG. 2 is a perspective view of a preassembled drainage line unit in accordance with the principles of the invention.

The embodiment shown in FIG. 2 utilizes a horizontal conduit 10 in the form of a corrugated PVC perforated vent pipe encased by a nylon netting or mesh which is filled with an aggregation of discrete, water impervious, crush resistant lightweight elements and secured to the pipe ends 24, 25 by means of conventional wires or tie fasteners 26 which thread through the netting at the open ends of the sleeve 22 to prevent the escape of the loose material 21. The pipe 10 has three rows of holes spaced in conventional manner and located in the lower portion of the tubing 10, with the outside rows spaced 120° on centers. The perforations provide for fluid communication between the inside of the conduit 10 and the hollows left between the aggregrate material elements 21.

A preferred material for the mesh 22 is a seamless plastic mesh tube of construction netting, with an expanded diameter of 13, 18, 24 or 36 inches clamped to the pipe 10 at one end of its length and loosely filled uniformally around the pipe with a plastic packaging material such as ¾ to one inch chunks of expanded polystyrene, styrofoam or other materials such as are suitable for crush protection in packaging. The other end 24 is tied off after the netting has been packed with the aggregrate material. A suitable netting is like that of commercially available lobster shipping netting (a heavy duty version of poultry or citrus produce-type netting), with a hole size of about ¾-inch, or less. Additional fill material for placement underneath the pipe is given in the form of a conduitless casing 30 (FIG. 3) which has a similar configuration to the unit 20 of FIG. 2, except that the casing 22 is tied off at one end, filled with aggregate material 21, then tied at the other end, without the insertion of a conduit 10.

Figure 3:
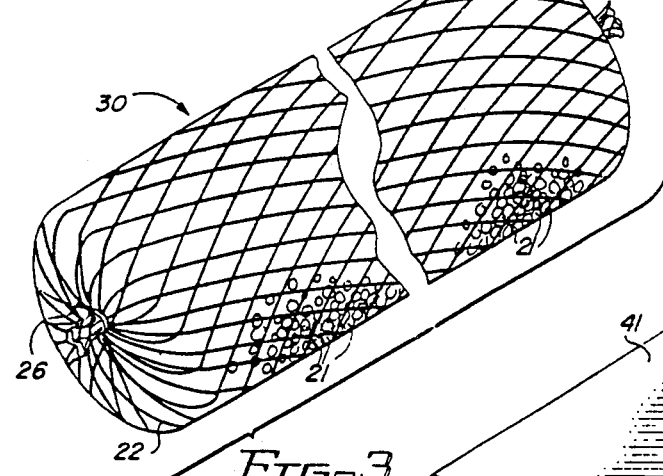
FIG. 3 is a perspective view of an aggregrate only preassembled unit in accordance with the invention.

The method of installation of a drainage field in accordance with the invention is illustrated in FIGS. 4A-4C, 5 and 6, in the context of a nitrification field installation utilizing the preassembled units shown in FIGS. 2 and 3.

As with conventional installation methods, a trench 12 is first dug to the required width and depth (FIG. 4A). The trench 12 may be dug, for example, with a backhoe or similar implement to provide a bank 32 representing the interface between the trench 12 and undisturbed soil 14. As illustrated, the trench is dug wider than required on one side 33 to permit a worker to stand therein during installation. Unlike conventional systems involving loose gravel aggregrate, a drainage system utilizing prefabricated units 20, 30 in accordance with the present invention can be readily installed with little difficulty by a single worker. The units 20, 30 prefabricated into convenient lengths, such as ten-foot lengths, are lightweight and easily carried by the worker to the site and laid in positions alongside the trench 17, as shown.

A convenient size of unit 20 provides a circular cross-section having a radius equal to the radius of the pipe 10 plus the minimum dimension D3 of aggregate needed above the pipe 10. To achieve the greater depth D2 of base aggregrate required below the conduit 10, an underlayment of aggregrate material is placed in the trench first. This is done, as shown in FIG. 4B by placing two of the conduit-less, elongated aggregrate-filled bags 30 side-by-side along the bottom of the trench 17, flush with each other and flush with the wall of the bank 32. To hold the units in place until the trench 12 is filled, a quantity of fill material, like dirt 34, may optionally be deposited against the side of the unit 30 at the widened part of the trench 17, as shown. A unit 20 is then added above the line of contact of the units 30 to position the horizontal conduit 10 in the desired position within the trench 12. The unit 20 is preferably secured to the underlying units 30 with wire or a plastic tie fastener 35 to present a triangular cross-section, as shown, having a unit at each corner.

This process is repeated for each length of units 20, 30 which are placed end-to-end for fluid communication from one unit to the next along the entire length of the nitrification trench. Each unit is easily lifted down into the trench, placed in position and secured. The aggregate-filled bag configurations of the embodiments of units 20, 30 of FIGS. 2, 3 are rigid enough to support the crosssection dimensional relationships between the pipe 10 and the aggregate 21, yet sufficiently flexible longitudinally to permit the units to follow the contour of the length of the trench 12. The opposed ends of the lengths of conduit 10 of adjacent units 20 are brought together to form a continuous perforated vent pipe.

When the units 20, 30 have been laid and connected end-to-end for the desired length of nitrification line, topsoil 16 is added to fill the remainder of the trench 12 and compacted to provide a depth of topsoil 16 to meet the required margin of fill between the top of the aggregate 21 (i.e. the top of unit 20) and the surface. Compacting may be performed, such as by overrunning the soil 16 with the large wheels of a backhoe or similar implement.

FIG. 5 shows an installation of drainage field in accordance with FIGS. 4A-4C for a horizontal level nitrification field with a substantially level trench and line having a fall not exceeding the maximum requirements specified by local code. As shown in FIG. 5, the adjacent units 20, 30 are brought together with the aggregate 21 of one unit 20, 30 in close longitudinal fluid flow communication with the aggregate 21 of an adjacent unit 20, 30 and with the end of the vent pipe 10 of one unit fitted into the facing end of the vent pipe 10 of an adjacent unit.

FIG. 6 shows a similar installation for a serial distribution, multiple level layout field having a stepdown suitable where topography prohibits the extension placement of nitrification trenches along a level grade. The installation in such situations proceeds as described above with reference to FIGS. 4A-4C and 5, except that a berm or dam 38 of specified height (e.g. 10 inches) is formed at the stepdown to meet the flow rate and runoff requirements. The units 30 are placed as before in the bottom of the trench 12, above the dam and on the step below. At the stepdown, however, a unit 20 runs from the prior unit 20 on the step above down to the next unit 20 on the step below, forming a vent path.

The aggregate elements 21 bounded by the perforated sleeve members 22 serve to define a drainage cavity 39 (FIG. 4C, 5 and 6) having predetermined uniform minimal dimensions $D_2$, $D_3$ of aggregate elements 21 lengthwise of the conduit 10. The loose aggregate material 21 bounded by the netting 22 also prevents the perforated pipe 10 from being crushed. The material of the aggregate is chosen to provide drainage and pipe protection characteristics within cavity 39 approximating those of a cavity of the same volume constituted by the loose aggregation of gravel found in conventional designs.

It will be appreciated that the lightweight bags of aggregated material constituting the units 20, 30 provide an ease and uniformity of installation not achievable by the conventional methods in which gravel or crushed stone is positioned and dimensioned on-site within the trench. The flexibility of the bags is a tremendous asset in laying the nitrification line around curves in adverse terrain. Time and labor is saved and the ease and uniformity of the system being installed is the same every time.

An example installation of a 50-foot line in a nitrification field was performed using four-inch PVC pipe 10, ¾ to one-inch expanded polystyrene cubes as aggregate 21, and 13-inch construction netting sleeves 22 of about ¾-inch hole size. Pipe and aggregate installation, which would have taken two to three hours to install with gravel once the trench had been dug, took less than ten minutes to install. The total job, including digging and filling the trench 12, which would normally have taken three to four hours, was completed in about one and one-half hours. The completed job had a much neater and more uniform appearance. No on-site- measurement was required to set the aggregate to required specifications. Except for the trench digging and final filling steps for which a backhoe was employed, the installation was performed by one worker with relatively little supervision, who carried and positioned the lightweight aggregate, pipe prefabricated packages 20, 30 himself with no tools or machines other than a shovel for the dirt 34 and a fastener for the ties 35 (FIG. 4B). It was found that with a six inch depth $D_4$ of cover 16 compacted by the back wheels of a backhoe, the vent pipe 10 remained absolutely round with the weight of the seven to eight-ton backhoe standing on it. At the end of installation, the dirt was dug out from the side of the trench 12 to see . the results. The soil interfacing with the aggregate material 21 was very good. There was a total depth $D_1$ of 14½ inches of material 21, 6½ inches of which was under the pipe . (depth $D_2$) and 2 inches of which was above (depth $D_3$). The distance from the top to the bottom of the trench 12 was about six feet. In the installation example, using 13-inch netting 22 and four-inch pipe 10 it was found with the deposition thereon of six feet of dirt 16, that the aggregate material 21 was not crushed and the pipe 10 retained its shape with good drainage characteristics.

In other example installations, it was determined that even in the worst conditions with rough terrain and muddy installation, the installation was quite simple giving a uniform consistency to the drain in a situation where bringing rock to the trench would be most difficult.

Figure 7:
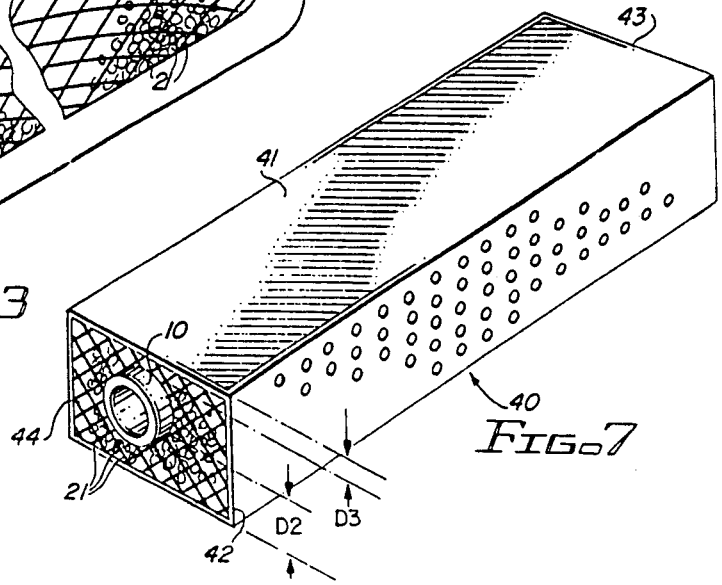
FIG. 7 is a view similar to that of FIG. 3 of a second embodiment of preassembled drainage line unit.

A second embodiment of preassembled drainage line unit 40 is shown in FIG. 7, in a view roughly corresponding to the view of the earlier embodiment shown in FIG. 2. The unit 40, like the unit 20 of FIG. 2, comprises a horizontally extending perforated conduit 10 surrounded by an aggregation of discrete, crush resistant, lightweight plastic elements 21. Rather than being surrounded by a perforated sleeve member 22 in the form of a netting or mesh envelope as in FIG. 2, however, a perforated sleeve member 41 of rectangular cross-sectional configuration is utilized, with the pipe 10 positioned a required minimum depth $D_2$ from the bottom of the sleeve 41 and a required minimum depth $D_3$ from the top of the sleeve 41. The sleeve 41 may take the form of a perforated extruded plastic member of desired unit length (e.g. ten feet). A suitable sectional dimension is 2-3 feet wide and 1-¼ feet high. The ends 42, 43 of the unit 40 are shown covered with netting 44, heat-seam welded top the perimeter of sleeve 41 and serving to retain the aggregate material 21 within the structure 40, at least until it is placed in the trench 12.

FIG. 8 shows the installation of a nitrification line, similar to that of FIG. 4C, utilizing the unit 40 shown in FIG. 7. As in FIG. 4C, lengths of units 40 are run end-to-end in the trench 12, with their conduits 10 interconnected to provide a continuous line and with the loose aggregate materials 21 of adjacent units 40 being in longitudinal fluid communication Unlike the unit 20 of FIG. 3, however, the size of the unit 40 is selected so that the complete dimensions of the aggregrate drainage cavity 39 are provided by a single unit 40, as opposed to the need for additional aggregate bags 30 as discussed above in connection with the installation of FIG. 4C.

As shown, the sleeve 41 is perforated to permit drainage into the soil percolate 14 adjacent the trench 12. The extruded sleeve 41 should be rigid enough to retain the required dimensional extent of aggregate 21 around the pipe 10, but be sufficiently flexible to permit it to follow the expected curvature of an average trench 12. A suitable choice for the sleeve 41 is extruded PVC with netting sonically welded across its open ends to retain the aggegate 21. The extrusion can be corrugated to give it the required rigidity and flexibility.

Although there may be advantages to having the sleeve 22 or 41 sufficiently durable and wear resistant so that the lines may be removed from the trench at a future date, the main purpose of the sleeve is to retain the measured quantity of aggregate in position until placed in the drainage field and a lesser grade material may therefore be acceptable.

The embodiment of the unit shown in FIG. 7, in use as a nitrification line, is likely to be less easy to snake around a curved trench and is harder to handle for the serial installation (FIG. 6), than the embodiment of unit 20 shown in FIG. 2. However, the embodiment 40 of FIG. 7 gives the advantage of having the full aggregate cavity 39 measurement in one unit. And, as can be seen with reference to FIG. 8, the unit 40 can be dropped into place without the necessity for digging a wider trench 12 as was done with unit 20 (FIGS. 4A-4C), so that the trench 12 need only be dug as wide as the width dimension of the sleeve 41. Embodiments of prefabricated units as in FIG. 7 may also be desirable in certain drainage situations other than nitrification lines, such as footings or open trenches used for dewatering saturated soils by collecting and conveying ground water to a drain pipe for discharge at a remote location.

FIGS. 9 and 10 show alternate embodiments 40', 40'' of the preassembled drainage line unit of FIG. 7. The embodiment 40' shown in FIG. 9 is suitable especially for footage drain and other applications, where added strength of sleeve 41 may be required. FIG. 9 utilizes an extruded sleeve member 41' which has diagonally extending webs 47, 48 which partition the cavity encompassed by the sleeve into longitudinally parallel segments 49, 50, 51, each of which receives a measured amount of aggregrate material 21. The webs 47, 48 provide added rigidity to the structure and define the position for placement of the conduit pipe 10. As shown in FIG. 9, each web 47, 48 extends from an upper corner internally of the sleeve 41' to a line 52 running along the inside of the base of the structure to define a V-shaped portion into the vertex of which the conduit 10 fits. Webs 47, 48 are perforated to permit fluid communication between the portions 49, 50 and 51.

The embodiment 40'', shown in FIG. 10, utilizes a vent channel 61 formed in the upper portion of the sleeve 41'' as a vent conduit rather than utilizing a separate vent pipe conduit 10 as in units 40, 40' of FIGS. 7 and 9. The unit 40'' is, thus, constructable from an extruded sleeve 41'' by packing a lower portion 62 of the unit 40'' with loose aggregrate material 21, the vent channel 61 in the upper portion being integrally formed with the extrusion of the sleeve 41''. The channel 61 is defined by the top 63 of the sleeve 41'' and a horizontal partition 64 extending between sidewalls 65, 66 from points partway down from the top 63, and running parallel to the top 63 for the full length of the unit 40''. Structural reinforcement of the channel 61 to prevent collapse of the structure 64 when weighted down from above is provided by diagonal cross-webbing 67. The cross-webbing 67 and the partition 64 are appropriately perforated to provide fluid communication between the channel 61 and the aggregrate 21. The top 63 may be perforated, as appropriate,.according to the use to be made of the channel. For a nitrification field application, the channel 61 takes the place of vent pipe 10 of FIG. 7. The top 63 is, thus, perforated and additional units 40'', with or without vent channels 61, can be added above the unit 40'', as needed, to provide additional aggregate material 21 to meet local code requirements for depth D3 of material 21 above the vent channel 61.

A provision can be made for the convenient end-to-end connection between perforated pipe 10 of one unit 20, 40, 40', 40'' and another. FIG. 11 shows such a provision for the connection of units 20 of FIG. 2.

As shown in FIG. 11, end caps 71, 72 of PVC plastic are snap-fitted to the ends 24, 25 of the perforated pipe 10. The end cap 71 provides a male fitting and the end cap 72 provides a complementary female fitting, so that the male fitting of an end cap 71 of one unit 20 will mate with the female fitting 72 of an end cap 72 of an adjacent unit 20. The end cap arrangement provides a snap-in system for interconnecting units 20 end-to-end, without requiring the contorting and threading of one pipe 10 into the other. The end caps 71, 72 preferably take the form of a clamshell-type structure with a living hinge, as shown, the male end being provided with a yieldable circumferential flange 73 that snaps over one run of corrugation of the pipe 10 at its inside end and a central tubular extension 74 at its outside end which inserts into a corresponding central tubular opening 75 opening to the outside end of the female end cap 72. Positioning lugs 76, 77 protrude above and below the tubular extension 74 for likewise insertion into corresponding lug receiving apertures 78, 79 located above and below the tubular opening 75. The end caps shown in FIG. 11 are circular in form with inwardly facing outer cylindrical portions 68 that extend peripherally around the ends 69, 70 of the sleeves. When end caps are used, the ends 69, 70 of the sleeve 21 (see FIG. 1) can be compressed by circumferential clamping, such as by a wire strap or ..fastener 80 (FIG. 11), rather than tying to the pipe ends 24, 25 at 26 (FIG. 1). The clamping will keep the aggregate contained until the end caps are applied.·

FIG. 12 illustrates a similar end cap arrangement for a rectangular unit. A male end cap 81 of box-like rectangular construction has a tubular extension 82 projecting centrally therefrom for mating with a central opening 83 in a corresponding female end fitting 84. The fittings 81, 84 are perforated to permit fluid communication longitudinally between adjacent units. The end caps 81, 84 are of semi-rigid material and have provision for fastening to the remainder of the rectangular unit. Fastening means, as shown in FIG. 12, may also take the form of a plurality of teeth peripherally spaced about the perimeter of the inside ends of the fittings 81, 84, which suitably capture the ends 69, 70 of netting to permit the rectangular configuration of the embodiment of FIG. 7 to be accomplished with a web or netting similar to that of unit 20 of FIG. 2, without the necessity for a rectangular extrusion 41.

Machinery 90 suitable for the manufacture of prefabricated drainage line units, such as units 20, 30 discussed above, is shown in FIGS. 13 and 14. A tubular mandrel 91 is positioned horizontally on a support 92 comprising legs 93, 94 and a horizontal support surface 95 extending therebetween. The mandrel has an upper opening 96 into which feeds the exit port of a funnel-like hopper 97 which serves to supply a quantity of aggregate material 21 by gravitational feed into the interior of the mandrel 91. An annular plate or disc 98 is vertically concentrically positioned for reciprocal movement along the longitudinal axis of the mandrel 91. An arcuate gate 99, of partial cylindrical shape, extends backwardly from the top of the plate 98 along a contour parallel with the internal dimension of the top of the mandrel 91. Transverse members or lugs 101, 102 extend laterally radially outward from opposite sides of the disc 98 through longitudinal slots 103, 104 in the mandrel wall. Hydraulic piston assemblies 105, 106 located externally of the mandrel 91 connect to the members 101, 102 to drive the disc 98 and gate 99 in reciprocal motion in response to selective control of hydraulic fluid flowing in fluid lines 107, 108.

A length of corrugated PVC perforated tubing 10 is placed axially within the mandrel 91 to extend from the mandrel rear opening 109 to the mandrel front opening 110, through a central opening 111 in the disc 98. A length of netting 22 is received in gathered position 112 peripherally about the circumference of the mandrel 91 at its discharge end 110. A tie fastener 26 is applied to fix or cleanup the netting 22 about the free end of the conduit 10 extending out of the opening 110. The disc 98 and gate 99 assembly is then drawn rearwardly by contraction of the arms of the pistons 105, 106 attached to the lugs 101, 102. As the disc 98 is brought from its forward (solid lines in FIG. 13) to its rearward (dot and dashed lines in FIG. 13) position, the gate 99 clears the opening 96 of the hopper discharge port and a quantity of aggregrate 21 drops into the mandrel 91 to surround the pipe 10 passing therethrough, filling the hollow created when the disc 98 is drawn back. The arms of pistons 105, 106 are then extended by control of fluid in the lines 107, 108, bringing the disc 98 forward again. This movement repositions the gate 99 over the hopper discharge port 96 preventing further discharge of material 21 into the interior of the mandrel 91. The forward movement of disc 98 also pushes the newly deposited aggregrate material 21 forward in the annular space surrounding the pipe 10 into the extended of netting 22, unwrapping and drawing with it a new portion of the gathered material 112. Because the front end of the pipe 10 is tied to the netting 22, pushing additional aggregrate into the netting to extend it also feeds a new length of pipe through the hole 103 in the disc 98 out of the front end 110 of the mandrel 91.

This reciprocation process continues with back and forth movement of the disc 98 under control of the hydraulic pistons 105, 106 until the other end of the sleeve 22, or the desired length of unit 20, is reached. At this point, the end or portion of the sleeve 22 closest to the mandrel exit 110 is attached with a tie or similar fastener 26 (FIG. 1) or clamp 80 (FIG. 11) to the pipe 10, and the pipe is cut rearwardly of the tie point, releasing one completed length of unit 20. A new gathered netting 22 is then tied or clamped to the cut end of pipe 10 remaining exposed at the discharge opening 110 of the mandrel 91, and the machine 90 is now ready for assembling the next unit 20.

To use the same machinery 90 for manufacture of the aggregrate only bag 30 shown in FIG. 3, the process proceeds in the same manner except that no pipe 10 is introduced into the mandrel 91. Furthermore, to prevent leakage of the aggregrate material 21 back through the rear of the mandrel 91 the opening in the disc 98 normally occupied by the pipe 10 is covered, as with a plate (not shown). A length of sleeve netting 22 is circumferentially mounted at the discharge port 110 of the mandrel 91 with its front end joined and tied at its center. The pistons 105, 106 are then operated to reciprocate the plate-covered disc 98 backwards and forwards, alternately opening and closing the hopper discharge port 96 to fill the bag 22, until the desired length of unit 30 is reached. The open end of the aggregate-filled bag 22 is then likewise tied at its center to contain the aggregate.

FIG. 15 illustrates an alternative mechanism 90' for the aggregrate loading process that utilizes an auger 121, instead of a reciprocating disc, to bring the aggregrate 21 forward within the mandrel 91. The auger comprises a helical blade 122 positioned peripherally of a hollow shaft in the form of tubing 123. The shaft 123 extends rearwardly of the mandrel 91 and is supported for rotation within a bearing 124. A sprocket 125 fixed to the tubing 123 at a position rearwardly of the bearing 124 serves to accommodate a chain 126 which is driven by a sprocket 127 mounted on the drive shaft of an electric motor 128. The inside diameter of the tubing 123 is sufficiently great to permit the passage therethrough of tubing 10. Plastic netting, 22 is gathered on the circumference of the discharge port as with the embodiment of machinery shown in FIGS. 13 and 14 and the method of filling the sleeve with aggregate material proceeds in a similar fashion, with the auger displacing the aggregrate 21 rather than a reciprocally moving disc. Conduit 10 in the form of corrugated tubing may be fed continuously into the rear 109 of the mandrel 91. For conduit 10 of four-inch diameter tubing, tubing 123 may be five-inch tubing. The mandrel 91 can suitably be a ten-inch pipe. A tension bar 129 can optionally be provided to hold the end of the plastic netting to prevent its release until the proper amount of material 21 has been stuffed into the bag.

As can be appreciated, similar machinery can be used to load the embodiments shown in FIGS. 7-10. The end caps of FIGS. 11 and 12 can be added before and after loading as part of the process. When end caps are used, upon completion of the filling of a unit length of netting with aggregate, two spaced clamps 80 (FIG. 12) can be applied automatically, such as by a strapping machine, and the pipe cut between two clamp positions, the one clamp serving to tie off the rear of the completed unit and the other serving to tie off the front of the next unit.

As is clear from the foregoing, the invention provides for easier, more uniform installation of drainage fields by providing a preassembled drainage line unit for placement in a trench. It will be appreciated by those skilled in the art to which the invention relates that although the invention has been described in terms of embodiments utilized for a nitrification field employed in a ground absorption sewage treatment disposal system, the principles of the invention may also be incorporated into footings, open trenches and other drainage systems in which an aggregate filled cavity conveys watery substances to or from a drain pipe. And, while the foregoing discussion has focused on drainage fields with lines, it is clear that the same principles apply to drainage beds.

It will be appreciated that other forms and cross-sections of conduit 10 can be used in place of those shown and that the loose aggregrate fill 21 can be constituted by material other than the specific materials suggested in the preferred embodiments above. It may be possible, for example, to use styrene, styrofoam or recycled plastic pieces of PVC. They may take the form of tubes, chipsor other suitably sized and graded chunks, such as "peanut" styrofoam pieces. They may also be sized and fabricated by recycling polyurethane, polypropylene plastics which are recovered in bulk and put in a chipper or cut with a hot screen. The aggregrate material may also be in the form of plastic balls; however, such shapes may be more expensive.

Those skilled in the art to which the invention relates will appreciate that there are moreover other substitutions and modifications that may be made to the described embodiments without departing from the spirit and scope of the present invention as defined by the claims amended hereto.

What is claimed is:

1. Apparatus for the manufacture of a preassembled drainage line unit comprising:
    a support;
    a tubular mandrel horizontally positioned on said support, and having a rear, upper and front openings;
    a hopper having an exit port and being positioned relative to said mandrel for supplying quantities of bodies of plastic material by gravitational feed into the interior of said mandrel;
    means for feeding a length of perforated vent pipe concentrically through said mandrel from said rear to said front opening;
    means for moving said quantities of bodies forwardly within said mandrel in the annular space between said mandrel and said pipe as said pipe is being fed through said mandrel; and
    means for moving said pipe and the adjacent bodies into the interior of a sleeve of netting concentrically received at the front opening of said mandrel and fastened to the front end of said pipe.

2. Apparatus as in claim 1, further comprising a disc transversely positioned concentrically within said mandrel across said annular space, and a gate extending rearwardly of said disc along a contour parallel with an internal dimension of the top of said mandrel; wherein said pipe concentrically feeding means includes a central opening formed in said disc through which said pipe is drawn; and wherein said body moving means comprises means for reciprocating said disc and gate within said mandrel between a rearward position in which said disc is behind said upper opening of said mandrel, and a forward position in which said gate covers said upper opening.

3. Apparatus as in claim 2, wherein said mandrel includes longitudinally extending slots on opposite sides thereof; and said reciprocating means comprises transverse members extending laterally radially outward from opposite sides of said disc through said slots, and hydraulic piston assemblies located externally of said mandrel and having reciprocating arms connected to said transverse members.

4. Apparatus as in claim 1, further comprising a shaft running concentrically through said mandrel from said rear to said front opening; wherein said pipe concentrically feeding means includes said shaft being formed with a central opening through which said pipe is drawn; and wherein said body moving means comprises a helical auger blade occupying said annular space, and means for rotating said shaft to turn said blade.

5. Apparatus as in claim 4, wherein said rotating means comprises a motor, and means for driving said shaft with said motor.

6. Apparatus for the manufacture of a preassembled drainage line unit, comprising:
    means for feeding a length of perforated vent pipe along a direction of manufacture;
    means for feeding a continuous sleeve of netting concentrically over the vent pipe along the direction of manufacture; means for continuously supplying quantities of bodies of plastic material into the space between the sleeve of netting and the vent pipe; and
    means for supplying quantities of bodies into the space between the vent pipe and the sleeve at the same rate as the rate of feeding of the vent pipe along the direction of manufacture.

7. Apparatus as in claim 6, wherein the vent pipe feeding means comprises a mandrel having a forward end with the vent pipe being fed through the forward end.

8. Apparatus as in claim 7, wherein the sleeve feeding means is at the forward end of the mandrel.

9. Apparatus as recited in claim 7, wherein the plastic bodies supplying means comprises a supply hopper communicating laterally with the interior of the mandrel.

10. Apparatus as in claim 6, wherein the supplying means comprises means for applying pressure against the plastic bodies along the direction of manufacture, and wherein the means for feeding the continuous sleeve is responsive to the pressure applying means.

11. Apparatus as in claim 10, wherein the continuous sleeve is attached at a forward end to the vent pipe.

12. Apparatus as in claim 11, further comprising means for attaching the sleeve to the vent pipe at a rearward end of the vent pipe spaced from the forward end thereof, such that severing of the vent pipe at the rearward end obtains a preassembled drainage line unit with the vent pipe in the center, and with the plastic bodies fully contained within the outer sleeve between the forward and rearward ends of the vent pipe.

* * * * *